G. W. FAWKS.
Portable Hay-Ricker.

No. 205,790. Patented July 9, 1878.

WITNESSES:
Achilles Schehl
C. Sedgwick

INVENTOR:
G. W. Fawks
BY Munn & Co
ATTORNEYS.

UNITED STATES PATENT OFFICE.

GEORGE W. FAWKS, OF PRAIRIE HILL, MISSOURI.

IMPROVEMENT IN PORTABLE HAY-RICKERS.

Specification forming part of Letters Patent No. 205,790, dated July 9, 1878; application filed April 30, 1878.

*To all whom it may concern:*

Figure 1:
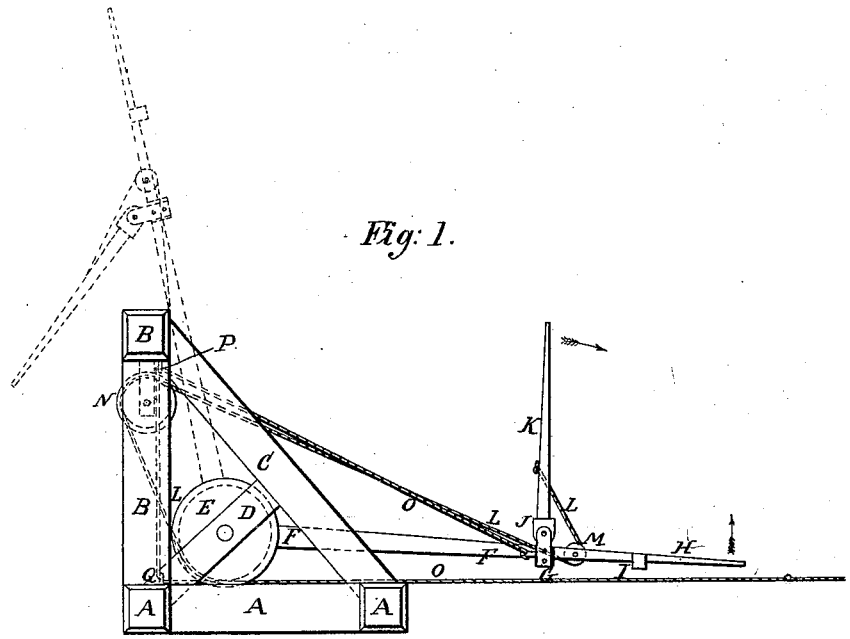
Figure 2:
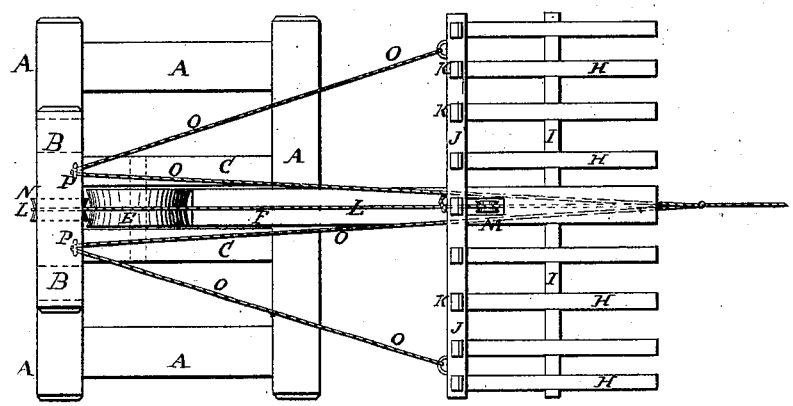

Be it known that I, GEORGE WASHINGTON FAWKS, of Prairie Hill, in the county of Chariton and State of Missouri, have invented a new and useful Improvement in Portable Hay-Rickers, of which the following is a specification:

Figure 1 is a side view of my improved machine. Fig. 2 is a top view of the same.

Similar letters of reference indicate corresponding parts.

The object of this invention is to furnish an improved machine for raising hay upon ricks, which shall be simple in construction and convenient in use, being so constructed that it may be readily drawn from place to place, as required.

The invention consists in the combination of the frame-work, the wheel or pulley, the lever, the rake-head, the hinged rake-head, the guide-pulleys or staples, and the cords with each other, as hereinafter fully described.

A is the base-frame of the machine, to the front side bar of which is attached a vertical frame, B. The connection between the top bar of the frame B and the front bar of the frame A is strengthened by two parallel inclined braces, C, placed at such a distance apart as to allow the lever to work between them.

To the middle parts of the inclined braces C and the rear side bar of the frame A are attached inclined braces D, to and between which is pivoted a grooved pulley or wheel, E. To one side of the pulley E is firmly attached the end of a lever, F, which passes through the space between the braces C, and to its forward end is attached a cross-bar, G, to which are attached a number of parallel teeth, H. The teeth H are made flat, and are tapered toward their points, so that they may rest closely upon the ground, and they are strengthened by a cross-bar, I, attached to them.

To the cross-bar G of the rake-head G H I is hinged a cross-bar, J, to which is attached a number of teeth, K. To the central tooth of the rake-head J K, at a little distance from its inner end, is attached the end of a cord, L, which passes around a pulley, M, pivoted to the central tooth of the rake-head G H I near its rear end. From the pulley M the cord L passes around a pulley, N, pivoted to supports attached to the center of the lower side of the top bar of the frame B. From the pulley N the cord L passes around a grooved pulley, E, and extends forward beneath the lever and rake-heads. To the end parts of the cross-bar G of the rake-head G H I are attached the ends of two cords, O, which pass around pulleys or through staples P attached to the lower side of the end parts of the top bar of the frame B. From the pulleys or staples P the cords O pass around pulleys or through staples Q attached to the upper side of the rear bar of the frame A. The ends of the three cords O L O meet and extend in front of the rake-head G H I to such a position that they may be readily attached to the rake when desired.

In using the machine, it is placed at the side of the rick or the formation for the rick, the rake-head G H I is lowered to the ground, and the rake-head J K is turned back. The loaded hay-rake is then drawn forward upon the rake-head G H I, the teeth of the rake passing between the teeth of the said rake-head. The ends of the cords O L O are then connected with the rake, and the rake is drawn back, leaving the hay upon the rake-head G H I. The length of the cords O L O is so arranged that the first draft-strain upon them will close down the rake-head J K upon the hay, clamping it securely, so that it cannot be drawn back by the rearward movement of the rake. As the rake continues to move back the next effect is to raise the rake-heads G H I and J K, with the hay clamped between them, into an upright position above the vertical frame B. As the strain is released upon the cords O L O the rake-head J K drops down, as shown in dotted lines in Fig. 1, allowing the hay to fall upon the rick.

If desired, the device may be stopped or held when raised into its erect position to prevent the hay from dropping out, so that the ricker can use it for topping out the rick or for other purposes, as desired.

Having thus described my invention, what I claim as new, and desire to secure by Letters Patent, is—

The combination of the frame-work A B C D, the wheel or pulley E, the lever F, the rake-head G H I, the hinged rake-head J K, the guide-pulleys or staples M N P Q, and the cords O L O with each other, substantially as herein shown and described.

GEORGE W. FAWKS.

Witnesses:
W. H. MANSUR,
V. A. WALTON.